(12) United States Patent
Baes et al.

(10) Patent No.: US 12,127,503 B2
(45) Date of Patent: Oct. 29, 2024

(54) SPLIT REEL COMBINE HEADER

(71) Applicant: CNH Industrial America LLC, New Holland, PA (US)

(72) Inventors: Frederik Baes, Reninge (BE); Yvan C. C. Vandergucht, Lo-Reninge (BE)

(73) Assignee: CNH Industrial America LLC, New Holland, PA (US)

( * ) Notice: Subject to any disclaimer, the term of this patent is extended or adjusted under 35 U.S.C. 154(b) by 700 days.

(21) Appl. No.: 17/415,169

(22) PCT Filed: Dec. 19, 2019

(86) PCT No.: PCT/EP2019/086237
§ 371 (c)(1),
(2) Date: Jun. 17, 2021

(87) PCT Pub. No.: WO2020/127683
PCT Pub. Date: Jun. 25, 2020

(65) Prior Publication Data
US 2022/0053700 A1 Feb. 24, 2022

(30) Foreign Application Priority Data
Dec. 20, 2018 (EP) .................................... 18214559

(51) Int. Cl.
*A01D 57/03* (2006.01)
(52) U.S. Cl.
CPC .................................. *A01D 57/03* (2013.01)

(58) Field of Classification Search
CPC ...... A01D 57/00–57/30; A01D 41/144; A01D 41/148; A01D 89/00–89/008; A01D 57/03; A01D 57/02
See application file for complete search history.

(56) References Cited

U.S. PATENT DOCUMENTS

| | | | |
|---|---|---|---|
| 2,506,980 A | 5/1950 | Verger | |
| 3,664,101 A | 5/1972 | Hurlburt | |
| 3,722,194 A | 3/1973 | Halls | |
| 3,724,183 A * | 4/1973 | Hurlburt | A01D 57/03 56/220 |
| 3,771,299 A | 11/1973 | Gradwohl et al. | |
| 4,068,454 A | 1/1978 | Webb | |
| 4,270,339 A * | 6/1981 | Wolfe | A01D 41/148 56/95 |
| 5,822,959 A * | 10/1998 | Norton | A01D 41/10 56/364 |

(Continued)

FOREIGN PATENT DOCUMENTS

| | | |
|---|---|---|
| DE | 19621656 | 12/1997 |
| FR | 2156993 A5 * | 6/1973 |

(Continued)

OTHER PUBLICATIONS

EP Application No. 18214559.9 Search Report dated Jun. 7, 2019, 4 pgs.

(Continued)

*Primary Examiner* — Adam J Behrens
*Assistant Examiner* — Madeline I Runco
(74) *Attorney, Agent, or Firm* — Peter K. Zacharias; Rebecca L. Henkel; Rickard K. DeMille

(57) ABSTRACT

The reel of a combine header includes a rotatable central tube with side members.

20 Claims, 2 Drawing Sheets

(56) References Cited

U.S. PATENT DOCUMENTS

| | | | | |
|---|---|---|---|---|
| 8,261,524 | B1* | 9/2012 | McClure | A01D 89/002 |
| | | | | 56/364 |
| 9,526,209 | B2* | 12/2016 | Honey | A01D 57/12 |
| 10,779,471 | B2* | 9/2020 | Bongiovanni | A01D 41/148 |
| 11,272,663 | B2 | 3/2022 | Modak et al. | |
| 2012/0047867 | A1* | 3/2012 | Coers | A01D 57/02 |
| | | | | 56/220 |
| 2017/0055452 | A1* | 3/2017 | Honey | A01D 57/02 |
| 2018/0242525 | A1 | 8/2018 | Schwinn | |
| 2019/0029179 | A1* | 1/2019 | Roberts | A01D 57/02 |
| 2019/0269072 | A1* | 9/2019 | Modak | A01D 57/04 |

FOREIGN PATENT DOCUMENTS

| | | |
|---|---|---|
| GB | 1106002 | 3/1968 |
| GB | 1536923 | 12/1978 |

OTHER PUBLICATIONS

PCT Application No. PCT/EP2019/086237 International Search Report and Written Opinion dated Apr. 24, 2020, 10 pgs.

\* cited by examiner

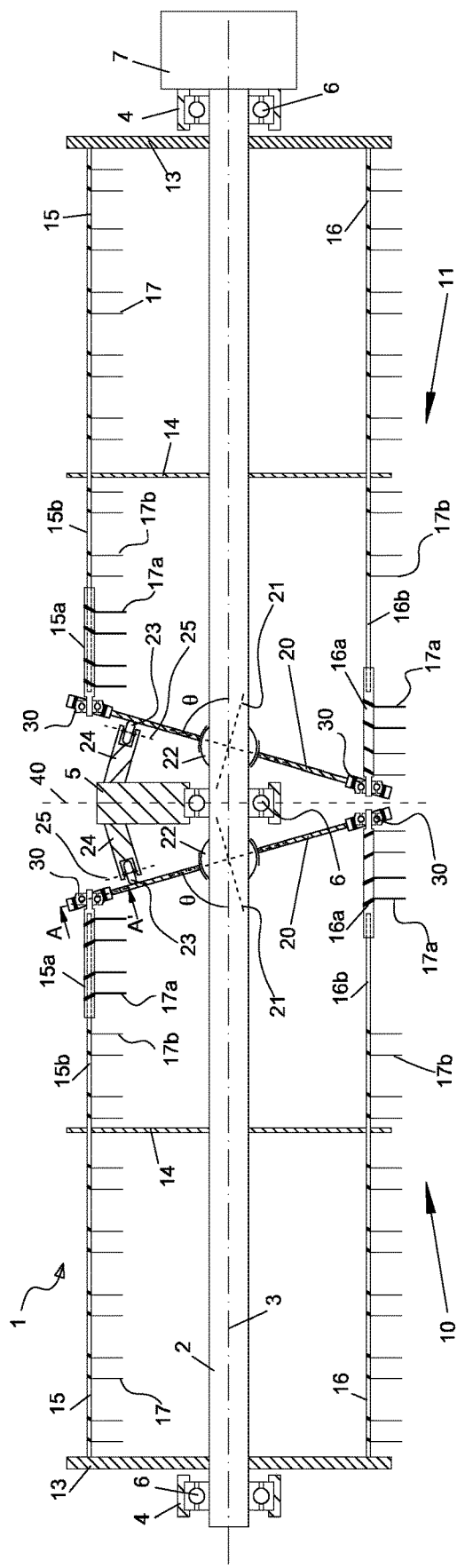
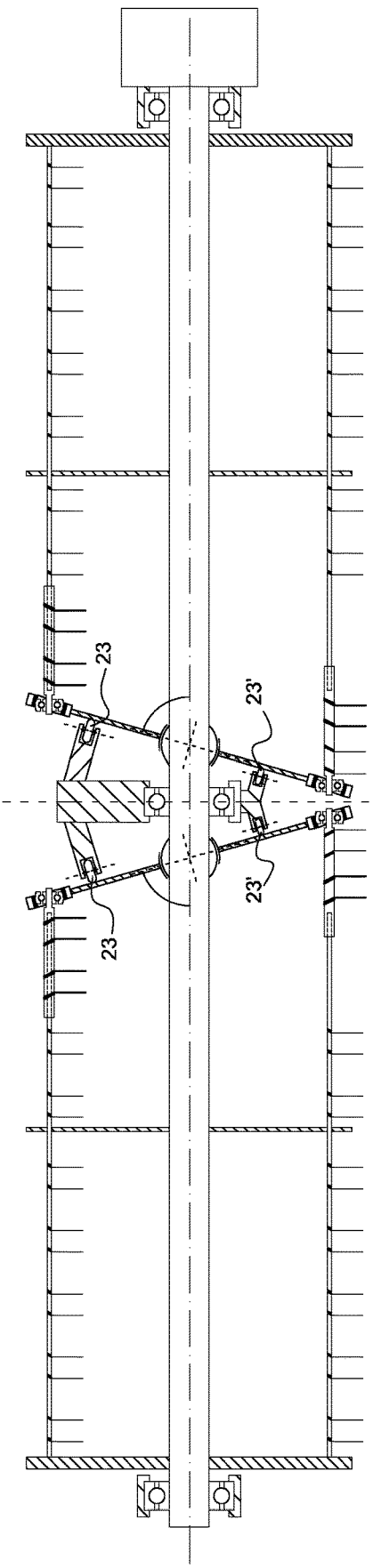
FIG. 1
FIG. 2

A-A'

SPLIT REEL COMBINE HEADER

CROSS-REFERENCE TO RELATED APPLICATION

This application is a national stage of PCT Application No. PCT/EP2019/086237, entitled "A Split Reel Combine Header", filed Dec. 19, 2019, which claims priority from and the benefit of EP Application No. 18214559.9, filed Dec. 20, 2018. Each of the foregoing applications is hereby incorporated by reference in its entirety.

FIELD OF THE INVENTION

The present invention is related to a header for a combine harvester, in particular to a reel mechanism mounted on the combine header. The invention is equally related to combine harvesters equipped with the header.

STATE OF THE ART

A grain header for a combine harvester is usually fitted with a rotating reel at the front. The reel comprises a central rotatable tube onto which transversal discs or spiders are attached, with parallel tine bars mounted at regular intervals along the circumference of the discs. Tines are attached along the entire length of the tine bars for guiding the crops with respect to the cutter bar of the header to ensure efficient cutting. The central tube is traditionally supported by two side arms mounted on the header frame, and placed on either side of the reel's longitudinal axis. The increased size of combine harvesters has led to the design of ever larger reels. Above a given reel size, the reel becomes too heavy to be supported only on two side locations. Split reels were introduced which are additionally carried by a central support. A split reel basically consists of two separate reels mounted on a common rotatable tube, supported at both ends by side arms as well as centrally by the additional support. A disadvantage of this construction is the fact that in the vicinity of the central support, no tine bars and therefore no tines are operative. In this area, the crops are at risk of being flattened by the cutter bar, or badly cut crops may build up and form a package before entering the header, thereby disrupting the further transport and processing of the crops.

SUMMARY OF THE INVENTION

The invention is related to a combine header and to a combine harvester as described in the appended claims. The header comprises a split reel with a central rotatable tube carried by two lateral supports and at least one intermediate support. The reel comprises a first and a second reel portion separated by the intermediate support. The reel portions comprise transverse members supporting tine bars oriented parallel to the central tube with tines attached to the tine bars. The two transverse members of the respective first and second reel portions positioned on either side of the intermediate support are maintained in a slanted position during rotation of the reel, so that the slanted members are closer together in the lower half of the reel than in the upper half. The tine bars are pivotably connected to the slanted members. According to preferred embodiments, the tine bars comprise first and second parts which are slidable axially with respect to each other. One tine bar part is pivotably connected to the slanted members so that the rotation of the reel generates a reciprocating motion of the pivotably connected tine bar parts relative to the other parts. The tines coupled to said pivotably connected parts thereby undergo a sideways motion, which enables these tines to guide crops in the central area of the reel that is not accessible by prior art split reel designs.

BRIEF DESCRIPTION OF THE FIGURES

FIG. 1 is a frontal view of a reel in a header for a combine harvester, according to an embodiment of the invention.

FIG. 2 shows an embodiment provided with additional rollers for maintaining a slanted position of the central transverse members.

DETAILED DESCRIPTION OF PREFERRED EMBODIMENTS OF THE INVENTION

Figure 3:
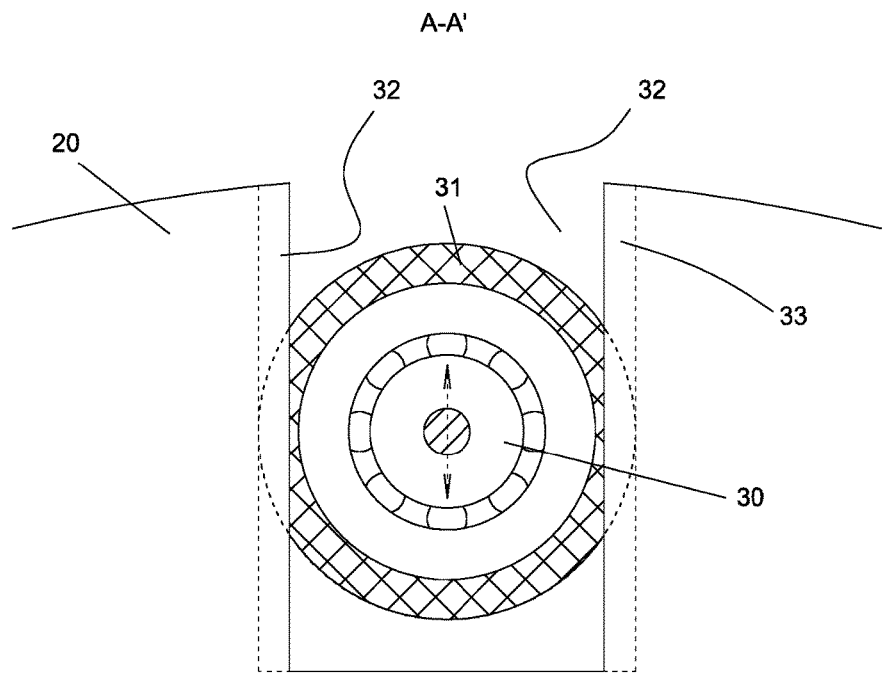
FIG. 3 shows a sectioned view of a radial ball bearing connecting a tine bar to a slanted transverse member in the embodiment of FIG. 1.
Figure 4:
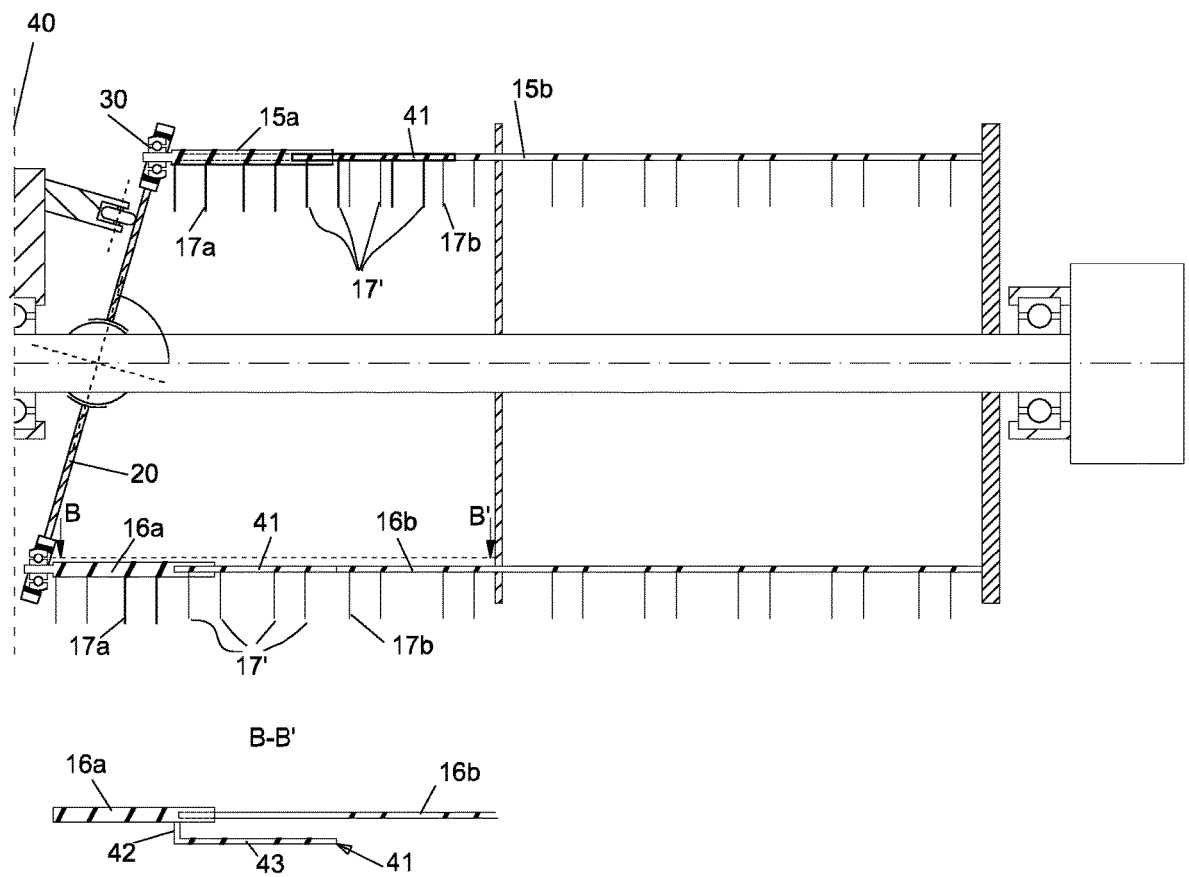
FIG. 4 shows an embodiment wherein tines are provided in the area where the tine bar parts are fully extended.

Preferred embodiments will now be described with reference to the drawings. The detailed description is not limiting the scope of the invention, which is defined only by the appended claims.

FIG. 1 shows a frontal and partially sectioned view of a split reel 1 in a header according to an embodiment of the invention. The reel comprises a central tube 2 that is rotatable about a central axis 3. The section is viewed in a vertical plane through the central axis 3. The tube is supported by side arms 4 and by a central support 5, the side arms and central support being attached to the frame of the header (not shown). At the three support locations, the tube 2 is rotatably coupled to the side arms 4 and the central support 5 through ball bearings 6. The tube 2 is coupled to a drive mechanism located inside a housing 7. The drive mechanism may be according to known technology. The reel 1 comprises a first portion 10 and a second portion 11 on either side of the central support 5. Both portions comprise a side disc 13 mounted at an outer end of the tube 2, and one or more planar intermediate discs 14. In the language of the appended claims, these discs are embodiments of the 'transverse members' mounted on the tube. Instead of discs, these members may have other suitable shapes such as spoked wheels also referred to as spiders.

The side and intermediate discs 13 and 14 are fixed to the tube 2, i.e. the rotation of these discs is driven by the rotation of the tube 2. They are preferably oriented perpendicularly with respect to the tube. The reel portions 10 and 11 further comprise tine bars 15 and 16 oriented parallel to the central tube 2 and mounted at regular intervals along the circumference of the side and intermediate discs 13 and 14. FIG. 1 shows a section of the reel by a vertical plane comprising the central rotation axis 3, when the upper and lower tine bars 15 and 16 are aligned with this vertical plane, hence only the upper and lower tine bars 15 and 16 are visible in the drawing. Usually six or more tine bars are present, depending on the diameter of the reel. The tine bars are fitted with tines 17. The orientation of the tines 17 is preferably controlled so that the tines are oriented downwards regardless of the rotational position of the reel 1. This may be achieved by various mechanisms known in the art, for example by coupling the tine bars to the side and intermediate discs through crank arms, the position of which is controlled by coupling these crank arms to an eccentric disc. In order not to needlessly complicate the drawings, the reel shown in the drawings does not show details of such a control mechanism. It is pointed out however that the invention is compatible with any of the known mechanisms of this type, as will be explained in more detail further in this description. The tine bars 15 and 16 are coupled to the side and intermediate discs 13 and 14 in any way known in the art and in accordance with the requirements of the applied mechanism for controlling the tine orientation. For example, the tine bars 15/16 may be rotatably mounted relative to the side and intermediate members 13/14 through ball bearings or other types of rotatable bearings. Details of these connections are however not depicted in the drawings.

Both the first and second reel portion 10 and 11 comprise a slanted disc 20 adjacent to the central support 5. The slanted discs 20 are configured to rotate together with the reel portions 10/11 while maintaining a fixed slanted position with respect to the frame of the header. The position of the slanted discs 20 is defined by an angle θ relative to the central rotation axis 3. The slanted discs 20 are thus rotatable about axes 21 oriented at an angle 90°-θ with respect to the central axis 3. Preferably the construction is symmetric, i.e. the angle θ is the same for the two reel portions 10 and 11. The orientation defined by the angles θ is such that the slanted discs 20 are closer together in the lower half of the reel than in the upper half. At one radial position of the reel in said lower half, the distance between the slanted discs 20 is at a minimum. Preferably this minimal distance is as small as possible, so that the slanted discs 20 are essentially closing the gap between the reel portions 10 and 11 at this radial position. This radial position may be located in the vertical plane through the central axis 3, in which case the slanted discs are mounted in a V-shape when regarded in a frontal view of the header, as in FIG. 1.

To enable the rotation of the slanted discs 20 about respective axes 21, the slanted discs 20 are pivotably mounted on the tube 2. Preferably this connection is established through pivot connections 22, for example through ball joints. In addition, rollers 23 are mounted on side brackets 24 attached to the central support 5 above the central axis 3. The rollers are preferably rotatable about axes 25 oriented at the angle θ with respect to the central axis 3, so that the rollers are perpendicular to the surface of the slanted discs 20. The rollers 23 force the slanted discs 20 to rotate about respective axes 21 whilst maintaining their angular position defined by the angle θ. Alternatively, the rollers 23 could be mounted in the lower half of the reel 1, or rollers 23 and 23' could be mounted both above and below the central axis, as illustrated in FIG. 2.

The tine bars 15,16 in each reel portion are formed of two parts (15a/15b for the upper bar in FIG. 1, 16a/16b for the lower bar) which are slidable with respect to each other, while staying parallel to the central axis 3. In the embodiment of FIG. 1, the tine bars comprise a hollow tube part 15a and 16a which are pivotably coupled to the slanted discs 20, i.e. the tube parts can pivot relative to the slanted discs 20 in a plane through the central axis 3, while any axial displacement of the tube parts 15a/16a with respect to the slanted discs 20 is prohibited. This connection may be established through pivot connections, for example through ball joints or through radial ball bearings 30, as shown in FIG. 1. The radial ball bearings 30 allow to maintain the slanted orientation of the discs 20 while the tube parts 15a/16a are able to rotate about their own longitudinal axis relative to the slanted discs 20.

The ends of the other tine bar parts 15b and 16b are axially slidable inside the hollow tube parts 15a and 16a in the manner of a piston and cylinder. Tines 17a and 17b are mounted respectively on the hollow tube parts 15a/16a and on the parts 15b/16b of the tine bars slidably engaging with said tube parts. As the reel 1 rotates, the slanted members 20 rotate about their respective axes 21 as described above. This motion forces the hollow tube parts 15a/16a of the tine bars to undergo a reciprocating motion with respect to the other parts 15b/16b of the tine bars, between a position at the bottom of the reel where the ends of the tine bar parts 16b are extracted to a maximum degree out of the hollow tube parts 16a, and a position at the top of the reel where the ends of the tine bar parts 15b are inserted to a maximum degree into the tube parts 15b.

According to an embodiment, this reciprocating motion is further enabled by the manner in which the radial bearings 30 (or equivalent pivot connections) are mounted in the slanted discs 20. As shown in the sectioned view in FIG. 3, the housings 31 of the radial bearings 30 are mounted in radial grooves 32 of the slanted discs 20, in such a way that the radial bearings 30 are capable of undergoing a reciprocating radial motion with respect to the slanted discs 20, as indicated by the arrows. Especially when the slant angle θ is relatively low, e.g. lower than 75°, this may be required to enable a circular trajectory of the tine bars 15/16 as seen in a plane perpendicular to the central axis, i.e. a trajectory whereby the distance between the tine bars 15/16 and the central axis 3 is constant. The reciprocating radial motion of the bearing 30 relative to the slanted members 20 is a consequence of the fact that the diameter of the circular path of the bearings 30 in the slanted plane is higher than the diameter of the circular path of the tine bar connections to the other transverse members 13 and 14. If the angular position of the slanted members 20 is steep, e.g. θ between 75° and 85°, the radial bearings 30 (or equivalent pivot connections) could be maintained at a fixed radial position relative to the slanted members 20. In this case, the tine bars 15/16 would need to be flexible enough to undergo a slight reciprocating bending motion as they rotate about the central axis 3. Another alternative would be to mount the radial bearings 30 or alternative pivot connections into the slanted members 20 with a given radial play (radial as seen with respect to the longitudinal axis of a tine bar), possibly limited by a spring.

As stated, tines 17a and 17b are attached respectively to the slidably engaging parts 15a,15b and 16a,16b of the tine bars. The attachment of the tines to the tine bar parts can be done in any way known in the art. Because of the slanted position of the side discs 20 and the reciprocating motion of the tube parts 15a and 16a, the tines 17a attached to these tube parts undergo a sideways reciprocating motion with respect to the central vertical plane 40 while at the same time rotating about the central axis 3. These tines 17a are thereby active in the area underneath the central support 5 so that crops in this area are effectively guided towards the knives of the header. In this way, the header of the invention represents an improvement over the prior art split reel headers in which no tines are active in the area between the reel portions.

As stated, the distance between the slanted members 20, as measured in the longitudinal direction of the reel 1, is at a minimum at one radial position in the lower half of the reel. Preferably, this radial position is in close proximity to the location of the knives of the header. A grain header is equipped with a cutter bar provided with reciprocating knives mounted at a cutting height close to the ground. The cutter bar is normally positioned behind the reel and in the vicinity of the lower half of the reel. When the minimum distance between the slanted members 20 is reached at a radial position of the reel that is close to the knives, the optimal functionality of the tines across the gap between the reel parts 10 and 11 is utilized in the area where it is most needed, namely at the location where the crops are cut by the knives. As seen in FIGS. 1 and 2, the part of the tine bar portions 15*b* and 16*b* which are reciprocating into and out of the tube parts 15*a* and 16*a* cannot be fitted with tines, as these would inhibit the reciprocating motion. In the embodiment of FIG. 3, lateral brackets 41 are mounted on the tube parts 15*a*/16*a*. The brackets 41 have a portion 42 that extends away from the tube part in the forward direction of the reel, and a portion 43 extending in the axial direction of the tine bars. The axial portion 43 is fitted with extra tines 17' attached to the axial portion 43 in the same manner as to the tine bars themselves. In the extended state of the tine bars at the bottom of the reel (illustrated by tine bar parts 16*a* and 16*b*), the presence of the axial portion 43 ensures that the extra tines 17' are operating in the extended area of the tine bars. In the retracted state of the tine bars at the top of the reel (tine bar parts 15*a* and 15*b*), the axial portion 43 overlaps the inserted part 15*b* of the tine bar, hence the extra tines 17' do not interfere with the standard tines 17 at this point. The bracket 41 could extend towards the rear of the header, instead of towards the front. In an alternative embodiment, a similar lateral bracket or support could be attached to the outer tine or tines 17*a* attached to the tube parts 15*a*/16*a* instead of to the tube parts themselves.

A number of variations to the above-described embodiments are within the scope of the invention. The tube parts 15*a*/16*a* of the tine bars may be coupled to the discs 13 and 14 instead of to the slanted discs 20, in which case the tine bar parts 15*b*/16*b* sliding inside the tube parts are pivotably connected to the slanted discs 20, preferably through the radial ball bearings 30. Instead of a piston/cylinder-type slidable connection shown in the drawings, any other axially slidable connection may be applied between the parts 15*a*/16*a* and 15*b*/16*b* of the tine bars. The invention is not limited to a split reel having an intermediate support 5 in the middle of the reel, nor to a split reel having two reel portions 10 and 11. In the case of more than two reel portions, the slanted discs 20 may be provided on either side of each intermediate support that separates two adjacent reel portions. The reel portion in between two intermediate supports would then comprise for example one intermediate transverse disc and two slanted discs, and the tine bars of that portion would comprise three slidable parts, two of which are pivotably connected to the two slanted discs.

Instead of the rollers 23 and/or 23', any other mechanism may be applied that forces the slanted discs 20 into their angular position. For example, each of the slanted discs 20 could be coupled to an auxiliary rotatable disc mounted on a bracket and maintained by this bracket at the required angle θ. These auxiliary discs could be placed outside the reel on both sides and be connected to the slanted discs 20 by coupling bars protruding through the transverse members 13 and 14 and parallel to the central axis 3. Another alternative would be to place actuators directly on the pivot connections 22 for maintaining the slanted positions of the discs 20.

As stated above, the invention is compatible with existing mechanisms for controlling the orientation of the tines 17 independently from the reel rotation, for example in order to maintain a downward orientation of the tines as the reel rotates. Depending on the type of control mechanism, particular adjustments to the inventive system may be required. A number of these control mechanism may require that the tine bar parts 15*a* and 15*b* (as well as 16*a* and 16*b*) cannot rotate relative to each other. These parts may then for example be produced as a spline connection or the receiving cavity of the tube parts 15*a*/16*a* may have a square cross section with the engaging ends of the other parts 15*b*/16*b* also square-shaped and fitting in the square cavities. In the vicinity of the side discs 13, the tine bars may then be coupled to a control mechanism known in the art for controlling the tine orientation, for example to an eccentric disc.

The invention claimed is:

1. A header for a combine harvester, comprising a cutter bar and a reel, wherein the reel comprises:
   a central tube rotatable about a central axis and supported by two lateral supports and an intermediate support;
   a first reel portion and a second reel portion, wherein the first and second reel portions are positioned on opposite sides of the intermediate support, and each reel portion of the first and second reel portions comprises:
      a plurality of transverse members mounted on the central tube;
      a plurality of tine bars; and
      a plurality of tines attached to the plurality of tine bars, wherein the plurality of tine bars are coupled to the plurality of transverse members at regular intervals along a circumference of the plurality of transverse members;
   wherein the reel has an upper half above the central axis and a lower half below the central axis; and
   wherein two slanted transverse members comprise a first slanted transverse member of the plurality of transverse members of the first reel portion and a second slanted transverse member of the plurality of transverse members of the second reel portion, the two slanted transverse members are positioned on opposite sides of the intermediate support, the first slanted transverse member is configured to rotate with the first reel portion, the second slanted transverse member is configured to rotate with the second reel portion, the two slanted transverse members are configured to be maintained in slanted positions with respect to the intermediate support during rotation of the reel, the slanted positions are such that the two slanted transverse members are closer together in the lower half of the reel than in the upper half of the reel, the plurality of tine bars of the first reel portion is pivotably connected to the first slanted transverse member so that rotation of the reel generates a first reciprocating motion of at least a portion of the plurality of tine bars of the first reel portion in an axial direction of the reel, and the plurality of tine bars of the second reel portion is pivotably connected to the second slanted transverse member so that the rotation of the reel generates a second reciprocating motion of at least a portion of the plurality of tine bars of the second reel portion.

2. The header according to claim 1, wherein a distance between the two slanted transverse members, as measured in the axial direction of the reel, is at a minimum at a radial position of the reel that is closest to the cutter bar.

3. The header according to claim 1, wherein each tine bar of the plurality of tine bars of each reel portion of the first and second reel portions comprises a first part and a second part which are slidable with respect to each other in the axial direction of the reel, the first part is pivotably connected to a respective slanted transverse member of the two slanted transverse members, and the second part is coupled to another transverse member of the plurality of transverse members of the reel portion.

4. The header according to claim 3, wherein the first part or the second part of each tine bar of the plurality of tine bars of each reel portion of the first and second reel portions comprises a tube, and the other part is configured to slide axially inside the tube.

5. The header according to claim 3, wherein the first part and the second part of each tine bar of the plurality of tine bars of each reel portion of the first and second reel portions are not rotatable relative to each other about a longitudinal axis of the tine bar.

6. The header according to claim 3, wherein the plurality of tine bars of each reel portion of the first and second reel portions are connected to the respective slanted member through ball joints or radial bearings.

7. The header according to claim 1, wherein the two slanted transverse members are mounted on the central tube through pivot connections.

8. The header according to claim 1, comprising at least one pair of rollers mounted on opposite sides of the central support and configured to force the two slanted transverse members into the slanted positions during the rotation of the reel.

9. The header according to claim 1, wherein the slanted positions of the two slanted transverse members are symmetric with respect to the intermediate support.

10. The header according to claim 1, comprising a gap between the first and second reel portions, wherein the two slanted transverse members close more of the gap at a radial position in the lower half of the reel than at a radial position in the upper half of the reel.

11. A combine harvester comprising a header comprising a cutter bar and a reel, wherein the reel comprises:
 a central tube rotatable about a central axis and supported by two lateral supports and an intermediate support;
 a first reel portion and a second reel portion, wherein the first and second reel portions are positioned on opposite sides of the intermediate support, and each reel portion of the first and second reel portions comprises:
  a plurality of transverse members mounted on the central tube;
  a plurality of tine bars; and
  a plurality of tines attached to the plurality of tine bars, wherein the plurality of tine bars are coupled to the plurality of transverse members at regular intervals along a circumference of the plurality of transverse members;
 wherein the reel has an upper half above the central axis and a lower half below the central axis; and
 wherein two slanted transverse members comprise a first slanted transverse member of the plurality of transverse members of the first reel portion and a second slanted transverse member of the plurality of transverse members of the second reel portion, the two slanted transverse members are positioned on opposite sides of the intermediate support, the first slanted transverse member is configured to rotate with the first reel portion, the second slanted transverse member is configured to rotate with the second reel portion, the two slanted transverse members are configured to be maintained in slanted positions with respect to the intermediate support during rotation of the reel, the slanted positions are such that the two slanted transverse members are closer together in the lower half of the reel than in the upper half of the reel, the plurality of tine bars of the first reel portion is pivotably connected to the first slanted transverse member so that rotation of the reel generates a first reciprocating motion of at least a portion of the plurality of tine bars of the first reel portion in an axial direction of the reel, and the plurality of tine bars of the second reel portion is pivotably connected to the second slanted transverse member so that the rotation of the reel generates a second reciprocating motion of at least a portion of the plurality of tine bars of the second reel portion.

12. The combine harvester of claim 11, wherein a distance between the two slanted transverse members, as measured in the axial direction of the reel, is at a minimum at a radial position of the reel that is closest the cutter bar.

13. The combine harvester of claim 11, wherein each tine bar of the plurality of tine bars of each reel portion of the first and second reel portions comprises a first part and a second part which are slidable with respect to each other in the axial direction of the reel, the first part is pivotably connected to a respective slanted transverse member of the two slanted transverse members, and the second part is coupled to another transverse member of the plurality of transverse members of the reel portion.

14. The combine harvester of claim 13, wherein the first part or the second part of each tine bar of the plurality of tine bars of each reel portion of the first and second reel portions comprises a tube, and the other part is configured to slide axially inside the tube.

15. The combine harvester of claim 13, wherein the first part and the second part of each tine bar of the plurality of tine bars of each reel portion of the first and second reel portions are not rotatable relative to each other about a longitudinal axis of the tine bar.

16. The combine harvester of claim 13, wherein the plurality of tine bars of each reel portion of the first and second reel portions are connected to the respective slanted member through ball joints or radial bearings.

17. The combine harvester of claim 11, wherein the two slanted transverse members are mounted on the central tube through pivot connections.

18. The combine harvester of claim 11, wherein the header comprises at least one pair of rollers mounted on opposite sides of the central support and configured to force the two slanted transverse members into the slanted positions during the rotation of the reel.

19. The combine harvester of claim 11, wherein the slanted positions of the two slanted transverse members are symmetric with respect to the intermediate support.

20. The combine harvester of claim 11, wherein the header comprises a gap between the first and second reel portions, and the two slanted transverse members close more of the gap at a radial position in the lower half of the reel than at a radial position in the upper half of the reel.

* * * * *